United States Patent [19]
Donne et al.

[11] Patent Number: 5,589,427
[45] Date of Patent: Dec. 31, 1996

[54] SUBSTANTIALLY SPHERICAL PARTICLES OF LITHIUM SILICATES WITH IMPROVED MECHANICAL PROPERTIES AND IMPAIRED SURFACE QUALITY

[75] Inventors: Mario Dalle Donne, Stutensee; Guster Schumacher, Karlsruhe; Volkmar Geiler, Mainz; Marc Clement, Mainz; Burkhart Speit, Mainz, all of Germany

[73] Assignee: Schott Glaswerke, Mainz, Germany

[21] Appl. No.: 307,693

[22] PCT Filed: Mar. 19, 1993

[86] PCT No.: PCT/EP93/00671

§ 371 Date: Dec. 29, 1994

§ 102(e) Date: Dec. 29, 1994

[87] PCT Pub. No.: WO93/19474

PCT Pub. Date: Sep. 30, 1993

[30] Foreign Application Priority Data

Mar. 24, 1992 [DE] Germany .......................... 42 09 420.8

[51] Int. Cl.$^6$ .................................................. C04B 35/16
[52] U.S. Cl. ..................... 501/33; 501/133; 501/154; 106/600; 376/146; 428/404
[58] Field of Search ................. 106/600; 501/33, 501/133, 154; 428/404, 406; 376/151, 411, 915, 916, 146; 976/DIG. 93, DIG. 94, DIG. 95, DIG. 96, DIG. 97, DIG. 98

[56] References Cited

U.S. PATENT DOCUMENTS

| | | | |
|---|---|---|---|
| H259 | 4/1987 | Tam et al. | 376/146 |
| 3,755,158 | 8/1973 | Inazuka et al. | 423/11 |
| 4,042,482 | 8/1977 | Shannon et al. | 204/242 |
| 4,151,409 | 4/1979 | O'Hare | 250/212 |
| 4,469,628 | 9/1984 | Simmons et al. | 501/53 |
| 4,482,390 | 11/1984 | Airey et al. | 106/431 |
| 4,541,869 | 9/1985 | Maak et al. | 106/38.35 |

FOREIGN PATENT DOCUMENTS

| | | |
|---|---|---|
| 2702080 | 7/1977 | Germany . |
| 3742023 | 6/1989 | Germany . |

OTHER PUBLICATIONS

"Improvement of the mechanical stability of lithium–orthosilicate pebbles", G. Schumacher, et al., *Fusion Engineering and Design*, vol. 17, 1991, pp. 31–36.

"Inpile tritium release from ceramic breeder materials in TRIDEX experiments 1–6", W. Krug, et al., *Fusion Engineering and Design*, vol. 17, 1991, pp. 65–71.

"Properties of Lithium Orthosilicate Spheres", G. Schumacher et al., *Journal of Nuclear Materials*, vol. 155, (57), 1988, pp. 451–454.

*Primary Examiner*—Paul Marcantoni
*Attorney, Agent, or Firm*—Millen, White, Zelano & Branigan

[57] ABSTRACT

Substantially spherical particles of lithium silicates with improved mechanical properties and improved surface quality are provided, which are particularly suited for use as breeding material for tritium. The particles are characterized in that they contain additions of tellurium and/or tellurium compounds.

14 Claims, 3 Drawing Sheets

SUBSTANTIALLY SPHERICAL PARTICLES OF LITHIUM SILICATES WITH IMPROVED MECHANICAL PROPERTIES AND IMPAIRED SURFACE QUALITY

This application is a 371 of PCT/EP93/00671, filed Mar. 19, 1993.

BACKGROUND OF THE INVENTION

The invention concerns substantially spherical particles of lithium silicates wherein in particular the mechanical properties are significantly improved by means of special additives (up to 5 wt. % tellurium and/or tellurium compounds), without unfavorably influencing the property of the particle material of releasing tritium upon neutron bombardment, so that said particles can advantageously be used as breeder material for tritium.

Lithium silicates present one option for direct production in the reactor of the tritium needed in nuclear fusion. The $^6_3Li$ present in the lithium silicate thereby traps the neutrons generated in the fusion process and transforms itself into helium and tritium in a nuclear reaction (breeeding reaction):

$$^6_3Li + ^1_0n \longrightarrow ^4_2He + ^3_1T \tag{1}$$

The tritium generated is then used in the reactor in a plasma in the nuclear fusion reaction, whereby it releases neutrons which can then be used for the breeding reaction:

$$^3_1T + ^2_1D \longrightarrow ^4_2He + ^1_0n + energy \tag{2}$$

The $^6_3Li$ needed for the breeding reaction can be provided in a number of forms, for example as lithium silicate, whereby lithium orthosilicate is preferred (viz. Fusion Technology, 1990, page 978).

In the case of solid lithium carrier agents there are a number of possibilities of arranging these in a packet bed (viz. E. Proust et al., 2nd Int. Symp. on Fus. Technol., Karlsruhe, Jun. 2–7, 1991), whereby the arrangement in the form of a pebble bed presents only one option.

If the option of a pebble bed is desired as the arrangement for a fusion reactor, the particles can be directly produced from the melt according to a known process (spray process, centrifuging process and the like) in a size of up to some 1000 μm.

In production processes whereby spherical particles are directly produced from the melt, micro-cracks and cavities are normally observed which may affect up to app. 10–20% of the particles produced. These particles are classed as defective, since they only possess little mechanical capacitance. For example, the maximum pressure capacitance of such particles of lithium orthosilicate particles falls from 8 Newton to 2 Newton, when the above-described defects occur (viz. J. Nuc. Mater., 155–57 (1988), 451). Since the defective particles are statistically distributed among the faultless particles, the totality of all particles possesses a considerable variation in mechanical properties. The pressure test described below serves to assess mechanical capacitance.

If the particles are subjected to constantly changing temperature and pressure strain during use, a part thereof can be destroyed and their suitability thus be called into question. This case is given, if the particles are used as breeding material for tritium in a fusion reactor. Their suitability as breeding material is determined by the thermocycling test described below.

Simulation tests for the temperature and pressure capacitance of a pebble bed in the blanket of a fusion reactor conducted with known spherical lithium silicates show that up to 10% of the particles used do not resist the strain and break (viz. Fusion Technology, 1990, p. 822). Particularly the above-described defective particles are thus affected.

Tests with additions of silicon to the lithium orthosilicate and/or Compounds thereof as well as aluminium and/or aluminium compounds were already conducted at laboratory level a number of times; they resulted in improvements, but these could only be obtained upon subsequent treatment under precisely defined conditions (viz. Fusion Technology, 1990, p.822). The subsequent treatment consists of heating the pebbles of Li-orthosilicate in a rotating tube furnace to a temperature of precisely 1030° C. and then swiftly cooling them again to below 1024° C. At temperatures above 1024° C. the time during which the Si-rich phase is liquified (viz. FIG. 5) may thereby not exceed 5 minutes, since the pebbles would otherwise fuse with each other. Pebbles which do not reach the critical conditions so defined do not achieve an improvement of their mechanical properties. The realization of these precisely defined conditions on a large scale is therefore extremely difficult.

SUMMARY OF THE INVENTION

The invention proceeds from the problem of optimizing the mechanical and surface properties of spherical particles of lithium silicates suited as breeding material for nuclear fusion, which my contain up to 5 weight-% aluminum and/or silicon and/or compounds thereof as additives, and to reduce the number of defective particles to a minimum, whereby the breeding qualities are, as far as possible, not to be impaired, i.e., the release of tritium is to remain as unaffected as possible.

The problem is solved according to the invention in that additions of tellurium and/or tellurium compounds are added. For example, the particles can contain up to 5 wt. % tellurium and/or tellurium compounds.

The particles according to the invention can, as such, be produced directly from the melt by a known method. Known production methods other than direct production from the melt to produce a packet bed may also be used.

The particles used as breeding material in nuclear fusion technology may be also be present in forms other than globules (powder, lamina, pressed particles etc.). For this reason, the invention is also not exclusively confined to spheric particles, but includes particles which are to a certain degree non-spheric.

The additions according to the invention have the effect that, on the one hand, the inclination towards formation of micro-cracks and cavities in the particles is greatly reduced, and on the other, their surface roughness is substantially diminished. As a result, less variations in the mechanical and physical properties of the particles are observed and their mechanical strength is generally improved to an unexpected extent, as is shown by the comparative tests below.

It is therefore irrelevant whether lithium silicates with enriched or depleted $$^6_3Li$$

Li are used.

These advantageous properties are maintained even if the particles are subjected to tempering after the production process.

The mechanical properties of the lithium silicates according to the invention are so good that they can also be used in other fields of technology, e.g., in ball bearings and the like. Spherical particles of larger dimensions than those used in nuclear fusion are, of course, employed for such applications.

Methods for executing the invention

EXAMPLE 10 pebbles respectively having a particle size of 0.5 mm of samples A to D of known composition serving for comparison and of samples E and F of the composition according to the invention are subjected to the pressure test described below.

The samples were produced directly from the melt. For this purpose, batch mixtures of the compounds of the material components known from the prior art (e.g., $Li_2CO_3$, $SiO_2$, $TeO_2$) are produced and melted in corrosion-resistant melt vessels at 1380° C.–1400° C. To introduce the Li-content to produce the batch mixtures, compounds are suitably selected which contain a certain amount of the isotope $^6Li$, whereby no influence can be determined on the melting behavior and structuring of the material of the amount of the lithium isotope $^6Li$ in the base material. It is, however, also possible to select lithium compounds wherein the $^6Li$-content corresponds to the normal content corresponding to commercial custom. The production of the pebbles is effected by means of atomization of the glass flow emitted according to the process described in the U.S. Pat. No. 3,294,511, whose disclosure is referred to. The emitted liquid melt flow thereby has a temperature of at least 1370° C.–1400° C. and a diameter of 1 to 5 mm. In contrast to the above-cited publication, a cold compressed air stream is used to atomize the melt flow, whereby the velocity of the compressed air stream is between 50 m/s and 300 m/s at the escape point. A temperature of between 30° C. and 500° C. prevails in the atomization chamber. The different material compositions specified in the table were obtained by means of corresponding batch mixture compositions.

Samples A to F described below were melted as raw batch mixture at the temperatures specified above and the melt thus obtained was then also subjected to the atomization treatment described above.

The reference samples A and B consisted of pure lithium orthosilicate, C and D of lithium orthosilicate additionally containing 2.2 weight-parts $SiO_2$ per 100 weight-parts.

The samples E and F according to the invention consisted of lithium orthosilicate additionally containing 2.2 weight-parts $SiO_2$ and 0.5 weight-parts Te per 100 weight-parts.

The samples were subjected to the pressure test both in untreated state (samples A, C and E) and after tempering in a rotating tube furnace (samples B, D and F).

The mechanical stability of the particles was tested with an apparatus specifically constructed for this purpose, which is shown in FIG. 1. The Li-orthosilicate pebble is thereby pressed against a carrier mounted on the weigh bin of a microbalance by means of a piston. The microbalance shows the real weight imposed on the pebble during the test. By feeding water into the container to which the piston is attached the pressure bearing on the pebble is gradually raised until the pebble breaks. This fracture load acts as the measure of the mechanical stability of the pebbles.

The results of the pressure test are shown in Table 1. They show that the pebbles of the composition according to the invention display a significantly reduced variation of mechanical properties even without tempering, whereby the fracture load was surprisingly increased by up to 30%.

To test the suitability of the particles as breeding material for tritium, the particle beds were subjected to the so-called thermocycling test which simulates the thermal and mechanical strain in the blanket of the fusion reactor. The particles are thereby filled into a container in dense package under vibration, whereby said container comprises two thermocouple elements, of which one is arranged in the center of the particle bed and the other on the wall of the container (FIG. 2). The container is induction-heated during the test until the wall reaches a temperature of 600° C. This temperature is maintained until the temperature in the center of the particle bed reaches a value between 530° and 600° C. The container is then quenched in water, so that the temperature in the container wall sinks to below 100° C. This is the moment in which the particle bed is subjected to the highest mechanical and thermal strain, since the temperature in the center of the particle bed is still app. 500° C. The tests are first conducted manually for 10 cycles using the container according to FIG. 2 and are later continued in an automatic apparatus (FIG. 3) permitting a greater number of cycles. A typical temperature curve during the test is shown in FIG. 4.

The results of the thermocycling test are shown in Table 2.

They demonstrate that the spherical particles according to the invention are more resistant to the mechanical and thermal strain prevailing during thermocycling of the reactor in the blanket drums than the particles according to the prior art, both in original state and after tempering in the rotating tube furnace, whereby in the first case the percentage improvement compared to reference samples containing $SiO_2$ is particularly striking. It was demonstrated by means of neutron irradiation that the release of tritium from the particles was not affected by the addition of 0.5 weight-% Te.

TABLE 1

Loads (N) under which the individual pebbles
(0.5 mm diameter) broke and fracture loads FL (N)
(mean values of 10 measurements)
(Pebbles of pure lithium orthosilicate resp.
lithium orthosilicate + additives)

| Sample | Test No. | | | | | |
|---|---|---|---|---|---|---|
| | 1 | 2 | 3 | 4 | 5 | 6 |
| A pure, o | 2.7 | 2.7 | 2.7 | 2.7 | 3.5 | 3.9 |
| B pure, d | 1.6 | 5.4 | 3.6 | 2.5 | 0.6 | 0.2 |
| C +$SiO_2$, o | 3.5 | 5.7 | 11 | 11 | 6.2 | 5.0 |
| D +$SiO_2$, d | 7.0 | 4.8 | 8.5 | 9.8 | 6.9 | 10 |
| E +$SiO_2$, Te, o | 12 | 13 | 7.0 | 6.0 | 8.0 | 12 |
| F +$SiO_2$, Te, d | 5.0 | 11 | 9.5 | 12 | 10 | 10 |

| Sample | Test No. | | | | |
|---|---|---|---|---|---|
| | 7 | 8 | 9 | 10 | FL |
| A pure, o | 2.5 | 1.8 | 3.3 | 3.6 | 2.9 |
| B pure, d | 3.0 | 3.2 | 4.3 | 3.8 | 2.8 |
| C +$SiO_2$, o | 3.4 | 12 | 5.4 | 9.0 | 7.2 |
| D +$SiO_2$, d | 6.3 | 9.0 | 7.0 | 7.9 | 7.7 |
| E +$SiO_2$, Te, o | 13 | 11 | 11 | 13 | 10.6 |

TABLE 1-continued

Loads (N) under which the individual pebbles
(0.5 mm diameter) broke and fracture loads FL (N)
(mean values of 10 measurements)
(Pebbles of pure lithium orthosilicate resp.
lithium orthosilicate + additives)

| F +$SiO_2$, Te, d | 10 | 8.9 | 11 | 11 | 9.8 |
|---|---|---|---|---|---| o = original (as produced)
d = tempering in the rotating tube furnace addition of $SiO_2$=2.2 weight-%, of Te=0.5 weight-%

Samples A to D: prior art; samples E and F according to the invention

TABLE 2

Results of the simulation of mechanical and thermal
tension in the blanket (thermocycling test) with
pebbles of 0.45–0.56 mm diameter

| Material | Composition | % break | % micro-content* |
|---|---|---|---|
| 86/1 o (V) | +2.2 Weight-% $SiO_2$ | 11 | 0.02 |
| 86/1 a (V) | " | 2 | 0.02 |
| 89/1 o (V) | $Li_4SiO_2$ | 6 | 0.12 |
| 89/1 a (V) | " | 10 | 0.05 |
| 90/1 o (V) | +2.2 weight-% $SiO_2$ | 6.0 | ** |
| 90/1 d (V) | +2.2 weight-% $SiO_2$ | 1.4 | ** |
| 90/5 o (E) | +2.2 weight-% $SiO_2$ +0.5 weight-% Te | 4.2 | ** |
| 90/5d (E) | +2.2 weight-% $SiO_2$ +0.5 weight-% Te | 1.2 | ** |

*particle < 0.05 mm
**negligible
o = as produced
d = tempered in rotating tube furnace
a = tempered in stationary furnace
V = comparison
B = according to the invention The differences of the test results for reference samples 86/1 and 90/1 result from the improved production technology of the latter compared to the prior art.

In the reference sample without an excess of $SiO_2$ (89/1) the tempering resulted in a deterioriation of the mechanical properties due to enhanced crystal formation, as shown in Table 2.

Figure 1:
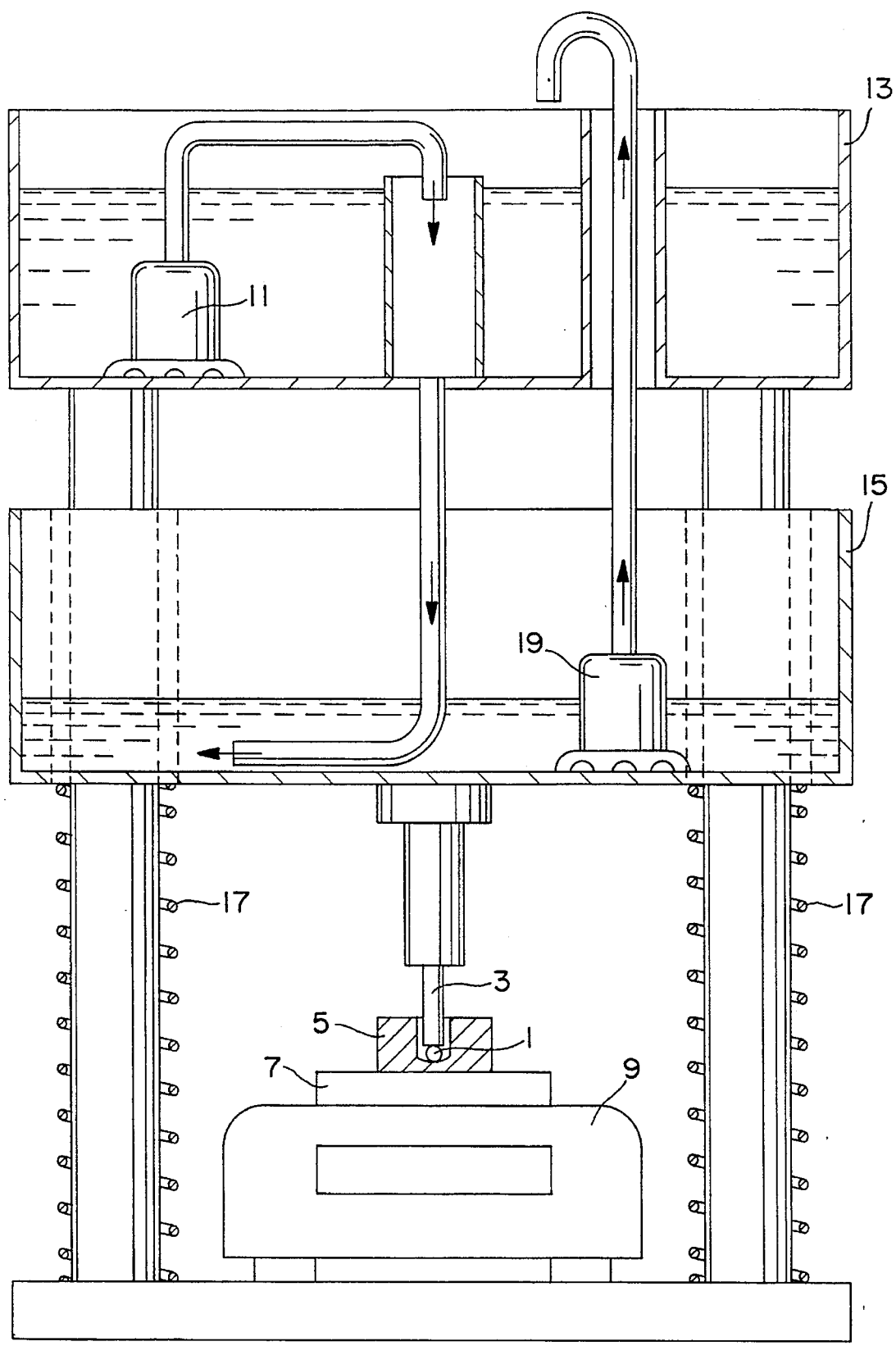
FIG. 1 depicts apparatus for testing the fracture load of the pebbles showing:
Water pump (off)
Water pump (on)
Spring
Pebble
Microbalance
Figure 2:
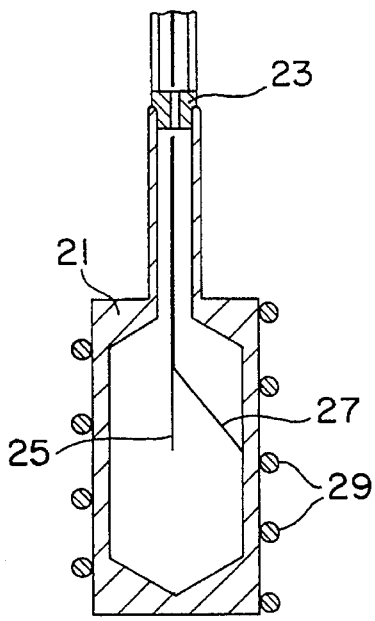
FIG. 2 depicts apparatus for manual thermocycling of breeding material pebbles showing:
Stopper
Induction coil
Water bath
Figure 2:
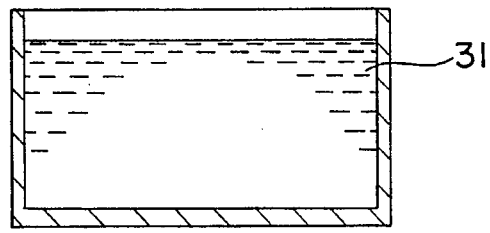
Figure 3:
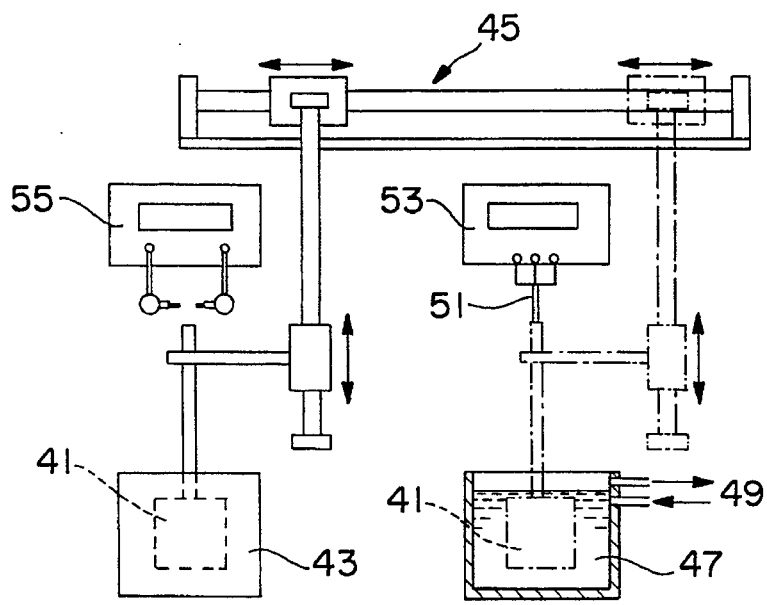
FIG. 3 depicts apparatus for automatic thermocycling of breeding material pebbles showing:
Horizontal-Vertical Electro-pneumatic displacement
Temperature measurement
Dimension measurement
Thermocoupling elements
Drum
Cooling water
Furnace 600° C.
Water bath 20° C.
Figure 4:
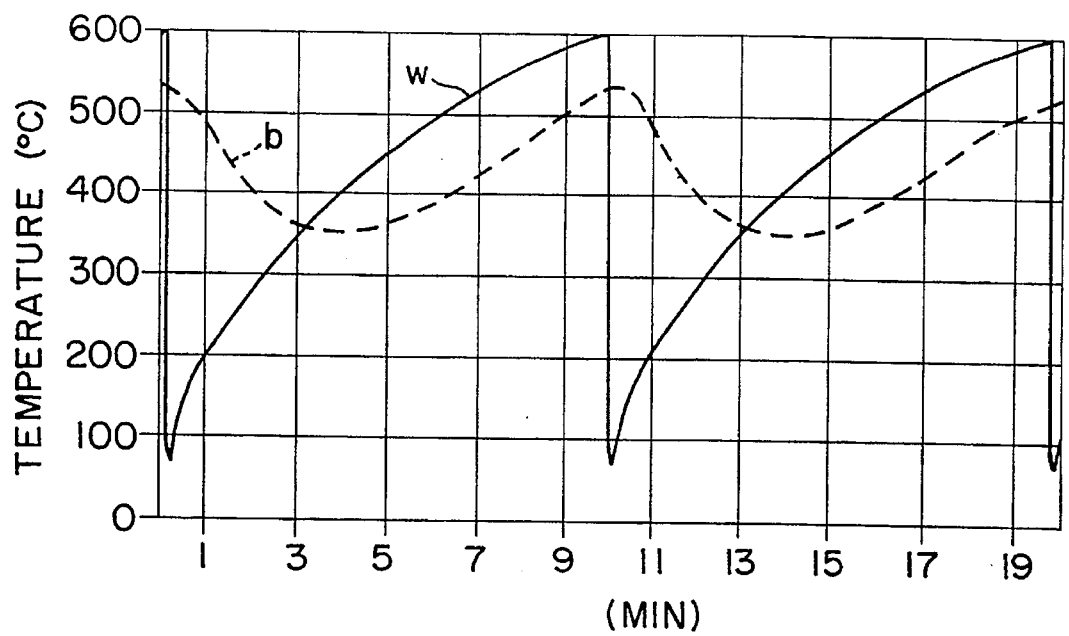
FIG. 4 is a temperature curve in the center of the particle bed (b) and on the container wall (w) during one thermal cycle wherein temperature is plotted against time (min).
Figure 5:
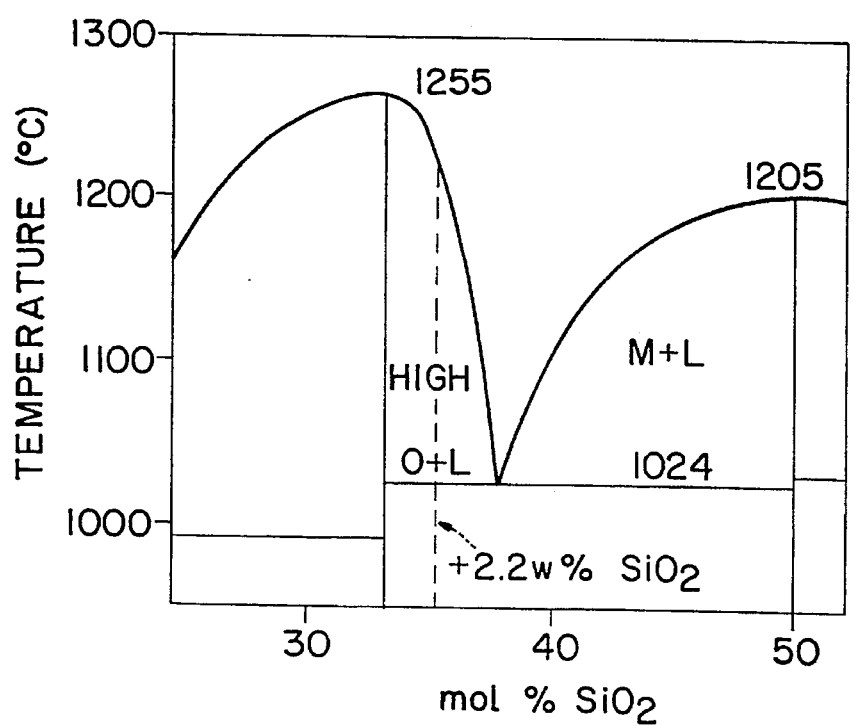
FIG. 5 is part of the $Li_2O-SiO_2$ phase diagram.

We claim:

1. A composition comprising particles of lithium orthosilicate, wherein said particles further contain tellurium, a tellurium compound, or combinations thereof.

2. A composition according to claim 1, wherein said particles contain up to 5 wt. % of tellurium, a tellurium compound or mixtures thereof.

3. A composition according to claim 2, wherein said particles are substantially spherical.

4. A composition according to claim 3, wherein said particles further contain up to 5 wt. % of aluminum, an aluminum compound, silicon, or a silicon compound or mixtures thereof.

5. A composition according to claim 3, wherein said particles contain 0.5–5 wt. % of tellurium, a tellurium compound or mixtures thereof.

6. A composition according to claim 3, wherein said particles contain 0–2.2 wt. % $SiO_2$.

7. A composition according to claim 3, wherein said particles are spherical.

8. A composition according to claim 4, wherein said particles contain 0.5–5 wt. % of tellurium, a tellurium compound or mixtures thereof.

9. A composition according to claim 6, wherein said particles contain 2.2 wt. % $SiO_2$.

10. A composition according to claim 8, wherein said particles contain up to 2.2 wt. % $SiO_2$.

11. A lithium orthosilicate particle composition comprising particles consisting essentially of (a) lithium orthosilicate and (b) tellurium, a tellurium compound or mixtures thereof; and said particles optionally contain up to 5 wt. % aluminum, an aluminum compound, silicon, a silicon compound, or mixtures thereof.

12. A composition according to claim 14, wherein said particles consist of:
lithium orthosilicate;
0.5–5 wt. % of tellurium, a tellurium compound or mixtures thereof; and
0–5 wt. % aluminum, an aluminum compound, silicon, a silicon compounds or mixtures thereof.

13. A composition according to claim 11, wherein said particles contain up to 5 wt. % of tellurium, a tellurium compound or mixtures thereof.

14. A composition comprising particles of lithium orthosilicate, said particles further containing tellurium, a tellurium compound, or combinations thereof in an amount whereby said particles exhibit a mechanical strength greater than that of lithium silicate particles without tellurium, a tellurium compound or mixtures thereof.

* * * * *